Feb. 22, 1966 W. J. CARRUTH 3,236,340

DUAL CONTROL BRAKING SYSTEM

Filed Nov. 6, 1962

INVENTOR
William J. Carruth
BY
T. R. Jukins
AGENT

United States Patent Office
3,236,340
Patented Feb. 22, 1966

3,236,340
DUAL CONTROL BRAKING SYSTEM
William J. Carruth, Farmington, Ga.
Filed Nov. 6, 1962, Ser. No. 235,806
4 Claims. (Cl. 188—152)

This invention relates to braking devices for use on vehicles especially automotive vehicles such as ordinary passenger cars and trucks and more particularly to a dual control for service brakes.

At the present time, passenger cars are generally equipped with hydraulic service brakes. As long as hydraulic braking systems are in good condition they are highly satisfactory, else their general use would not be so prevalent. Such systems have however, one serious potential source of danger, failure of the line or of any of the connected cylinders to hold the fluid for actuating the brakes renders the entire system, as generally used, completely inoperative. Moreover, a leaking system can develop without warning. Many accidents have been known to occur just after ordinary tests of the system have failed to show any defects. Sudden loss of brakes has been discovered without preliminary warning conditions such as a "soft pedal". A break in the line or the like may occur quickly, as opposed to, say, softening of the brakes when a working cylinder becomes initially cracked or a piston develops leaks.

Loss of brakes is especially dangerous when the vehicle is equipped with so-called automatic transmission, for the compression in the drive motor cannot be used to slow the vehicle to any great degree.

Hand or foot operated so-called emergency brakes are generally mandatory, but they often do not live up to the name. The position of the emergency brake control is not well standardized and so is not suitable for mentally automatic use. Moreover, emergency brakes are not biased to be disengaged, and often they become badly worn or burned when the vehicle is unintentionally driven with such brake "on."

In order to reduce the liability of sudden failure of hydraulic brakes, dual systems have been provided wherein two working cylinders are used at each wheel to actuate the brake shoes associated with each such wheel. The two working cylinders are fed by separate fluid lines pressured by ganged master cylinders. Such constructions are shown in patents Nos. 1,630,178 of May 24, 1927; 2,008,975 of July 23, 1935; 2,209,343 of July 30, 1940 and 2,918,148 of Dec. 22, 1959.

While the systems described next above appear to have considerable merit, none of them has received general acceptance and none is known, so far as I am aware, to have ever been used on any passenger car or truck commercially available. This situation continues despite almost daily published instances of fatalities due to vehicles getting out of control of the driver when braking action is suddenly lost.

An object of my invention is to produce an automobile which will reduce to a minimum, if not altogether eliminate, accidents due to failure of brakes by a broken hydraulic line or cylinder.

To attain this and other apparent objects, I provide the automobile with two completely separate hydraulic systems for operating each set of brake shoes, or similar friction means, and which may be operated either independently of each other or in unison. To accomplish this action I provide two independent operating pedals adjacent each other which may be operated by one foot and which may also be separately operated.

The advantage of operating the two brake pedals separately is at least two-fold. An outstanding advantage is that the driver will easily be able to know when one of the systems has sprung a leak. There is hardly any better reminder to the operator that his brakes are in need of repair than for him to get no response to pedal movement. At the same time he has assurance that he can carefully drive a limited distance to a repair shop with substantially no likelihood of failure of the remaining half of the system.

If the two master or pedal cylinders have ganged pistons, the systems of which I am aware either do not indicate to the driver when one half the system has failed or will permit at least twice the pedal movement permitted prior to the failure of the other half. This latter condition necessitates the use of "tight" brakes with increased danger of skidding or worse still, full pedal movement to the floor board may not impart sufficient movement of the shoes to effect effective braking after half the system has failed.

This invention provides the above cited advantages without the explained disadvantages.

In the accompanying drawing showing, by way of example two of many possible embodiments of the invention, FIG. 1 is a schematic representation of the braking system;

Figure 1:
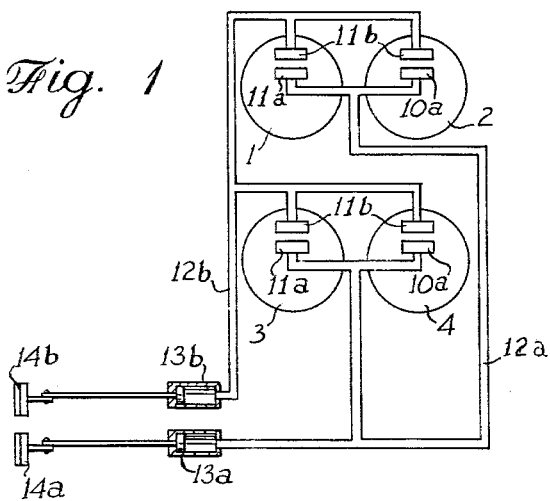
Figure 2:
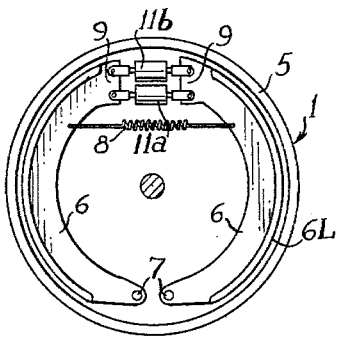
FIG. 2 shows a drum brake.
Figure 3:
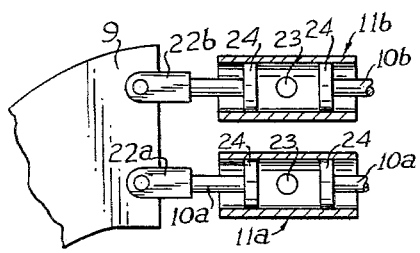
FIG. 3 is a fragmental enlarged view of the brake of FIG. 2.
Figure 4:
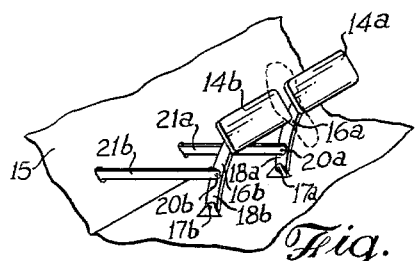
FIG. 4 is a perspective view of pedal controls of the braking system.

The invention as shown in FIG. 1 is for use with a vehicle having a plurality of wheels (not shown), say four, provided with respective drum brakes shown schematically at 1, 2, 3 and 4, the first of which is set forth in greater detail in FIG. 2 and all others are like it.

The brake 1 includes a conventional drum 5 having internal expandable shoes 6 on fixed pivots as at 7, and normally held in retracted position by a tension spring 8 but expandable to outer position so that lining 6L may frictionally engage the drum in a well known manner. The shoes are of generally known shape except for having enlarged free end-portions 9 so as to accommodate connection with inner and outer pairs of brake piston rods 10a and 10b associated with brake cylinders 11a and 11b. Preferably, the cylinders 11a and 11b and pistons are of the same size to avoid the necessity of manufacturing excessive parts although the two cylinder chambers may be bored in a single block.

The four inner cylinders 11a are connected by a pressure fluid line 12a to a conventional master or pedal cylinder 13a, while the four outer cylinders 11b are similarly connected by a line 12b to a master cylinder 13b like 13a.

The fluid in the separate pedal cylinders 13a and 13b and in their respective lines and working cylinders is increased by the respective depression of foot pedals 14a and 14b mounted near the floor board 15 in a manner well known in the art. As illustrated, the pedals are mounted on levers 16a and 16b pivoted on fixed pins 17a and 17b at the low ends 18a and 18b of the respective levers, the latter being pivotally connected as at 20a and 20b to piston rods 21a and 21b associated with the pedal cylinders 13a and 13b respectively.

Figure 5:
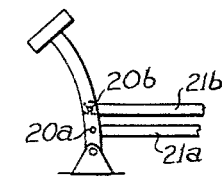
FIG. 5 is a view of a detail of the pedal control.

It will be noted in FIG. 5 that the leverage distance between pivots 20b and 17b is greater than that between 20a and 17a so that for the same force and movement applied to the two pedals the displacement of piston rod 21b is greater than that of piston rod 21a and the fluid in cylinder 13b is not subjected to as great an increase in pressure. This is because cylinder 11b and its piston rods 10b act on the shoes 6 at a greater distance from the shoe pivots 7 than does cylinder 11a and cylinders 11a and 12a are alike.

The piston rods 10a and 10b are connected to end portions 9 by well known pivot yokes 22a and 22b in known manner and each rod is mounted on a piston 24. Cylinders are, as mentioned, conventional and each provided with a port 23 for connection to the appropriate line.

Preferably the pedals 14a and 14b are adjacent each other so closely that the foot of the operator may depress the two simultaneously if desired. The reason for this is that if both halves of the system are working, substantially equal pressure or force can be applied by the brake pistons 10a and 10b without any danger whatsoever of bending the ends 9 of the shoe.

If, however, one half the system fails the operator will immediately sense the failure by a noticeable turn of the ankle, and use only the live pedal. One who has become accustomed thus to using both pedals can still obtain necessary braking but still feel impelled to have the failure corrected for habitual usage after the half of the system has failed.

Another advantage of my invention, when used with automobiles having automatic transmission, is that the invention provides two separate brake pedals. This is important in that it has often been suggested that with no clutch for such transmission the left foot can begin operating a brake while the right foot is being removed from the accelerator. The present invention will serve as a transition form of arrangement whereby the old and new driving habits can be used.

The convenient use of brakes by the left foot is highly desirable also when the vehicle is intentionally driven with the service brakes engaged to a partial extent. This operation is generally recommended when the vehicle is being driven through water, for the friction members are then in close contact and prevent excessive entry of water onto the braking surfaces.

Figure 6:
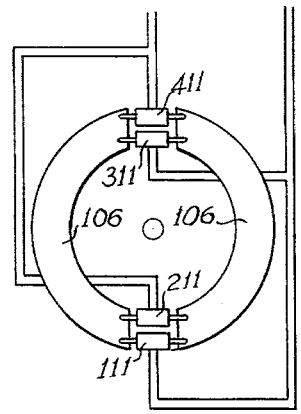
FIG. 6 shows a modification of the invention.

If rectilinear movement of the shoes is desired, four brake cylinders 111, 211, 311 and 411 for each drum may be provided for floating shoes 106, as shown in FIG. 6, wherein each fluid line is connected to an inner and a diametrically opposite outer cylinder. While this modification doubles the number of braking cylinders required, only one pedal type need be used, for the two fluid lines will then require like fluid pressure and movement if the braking cylinders are all alike.

While I have illustrated the invention in connection with drum brakes, many of the advantages of the invention can be realized even though the invention is used in connection with fluid actuated friction brakes in general, and of a type not mentioned.

For example, and merely to illustrate a principle, the left piston of cylinder 11a in FIG. 2 might be made fast to its cylinder and the rod connected to the left shoe removed. The right piston of cylinder 11b could likewise be made fast to its cylinder and its rod omitted. The action of this variation would be that the fluid in line 12a would operate the right shoe and that in line 12b the left. While this may not be particularly desirable with drum and shoe brakes, it illustrates that a friction member, the drum, may be engaged by two independently actuated engagement members, the shoes, to slow or stop the rotation of the drum.

The invention claimed is:

1. For a wheeled vehicle, two friction members mounted for being urged together to increase friction between the two members for braking action on at least one of the wheels of the vehicle; a pair of brake pistons both operatively connected to one of the members for moving said one of the members against the other member; a pair of brake cylinders receiving the respective pistons fluid-tight; a pair of levers mounted for pivotal movement independently of each other and adjacent each other; foot pedals on the respective levers; a pair of master cylinders having, respectively a pair of master pistons pivotally connected to the respective levers, and a pair of fluid-pressure transmission lines respectively connecting the master cylinders to the brake cylinders.

2. For a vehicle provided with wheels, a braking system having a set of friction members relatively movable to braking engagement and non-braking positions for each of the wheels; a pair of brake cylinders each with a piston for moving the members of each set relatively to each other into one of said positions; bias means for tending to move the members relatively to each other to the other position; a pair of master cylinders with pistons and a pair of fluid pressure transmitting lines respectively connecting the master cylinders to the brake cylinders; a pair of levers carrying foot pedals respectively thereon and respectively connected to the master pistons, the foot pedals being side-by-side and close together so that during operation of system when both lines and their respective cylinders are tight, force by a foot spanning the pedals may be substantially applied to both pedals and distributed substantially equally, and loss of reaction pressure due to failure of a line will tend to turn the ankle of the foot and signal to the operator an indication of the failure.

3. A braking system for wheeled vehicles comprising a circular brake drum and a shoe therein mounted for movement to braking engagement with the drum, said shoe having at least one movable end portion; a pair of like brake cylinders with pistons and rods therefor mounted in the drum, the axes of the pistons being substantially in radially inner and outer parallel chordal positions with respect to the drum; a pair of pivotally mounted levers having respective adjacent foot pedals thereon; a pair of master fluid pressure cylinders having pistons therein, and means mechanically connecting the latter mentioned pistons and levers, for displacement of such pistons to differing extents for the same pivotal movement of the levers, and a pair of fluid lines connecting the master cylinders and braking cylinders, the master cylinder of the piston which becomes displaced to the greater extent by the levers being connected by one of the lines to the outer of said brake cylinders.

4. For a wheeled vehicle, three friction members, two being mounted for movement against the third to increase friction between the said two and third members for braking action; a pair of brake pistons, each piston being operatively connected respectively to one of the said two members for moving said one of the two members against the third member; a pair of brake cylinders receiving the respective pistons fluid-tight; a pair of levers mounted for pivotal movement independently of each other and adjacent each other; foot pedals on the respective levers; a pair of master cylinders having, respectively a pair of master pistons pivotally connected to the respective levers, and a pair of fluid-pressure transmitting lines respectively connecting the master cylinders to the brake cylinders.

References Cited by the Examiner

UNITED STATES PATENTS

| 2,209,343 | 7/1940 | Masteller | 188—152 |
| 2,299,932 | 10/1942 | Scott | 188—152 X |
| 2,358,540 | 9/1944 | Smith | 188—152 |
| 2,374,196 | 4/1945 | Harbers | 188—152 |
| 2,726,738 | 12/1955 | Fawick | 303—2 X |
| 2,816,626 | 12/1957 | Fawick | 303—2 |
| 2,918,148 | 12/1959 | Uhlenhaut et al. | 188—152 |

FOREIGN PATENTS 478,826    3/1953    Italy.

MILTON BUCHLER, *Primary Examiner.*

EUGENE G. BOTZ, ARTHUR L. LA POINT, FERGUS S. MIDDLETON, *Examiners.*

G. E. A. HALVOSA, *Assistant Examiner.*